United States Patent
Nakagawa

(10) Patent No.: US 10,629,953 B2
(45) Date of Patent: Apr. 21, 2020

(54) LITHIUM ION SECONDARY BATTERY

(71) Applicant: Envision AESC Japan Ltd., Zama-shi, Kanagawa (JP)

(72) Inventor: Takashi Nakagawa, Zama (JP)

(73) Assignee: Envision AESC Japan Ltd., Kanagawa (JP)

( * ) Notice: Subject to any disclaimer, the term of this patent is extended or adjusted under 35 U.S.C. 154(b) by 293 days.

(21) Appl. No.: 15/298,407

(22) Filed: Oct. 20, 2016

(65) Prior Publication Data

US 2017/0125844 A1 May 4, 2017

(30) Foreign Application Priority Data

Oct. 30, 2015 (JP) .................................. 2015-213796

(51) Int. Cl.
| | | |
|---|---|---|
| H01M 10/0567 | (2010.01) | |
| H01M 4/131 | (2010.01) | |
| H01M 4/505 | (2010.01) | |
| H01M 4/525 | (2010.01) | |
| H01M 4/62 | (2006.01) | |
| H01M 10/0525 | (2010.01) | |
| H01M 10/0561 | (2010.01) | |
| H01M 4/02 | (2006.01) | |

(52) U.S. Cl.
CPC ....... *H01M 10/0567* (2013.01); *H01M 4/131* (2013.01); *H01M 4/505* (2013.01); *H01M 4/525* (2013.01); *H01M 4/628* (2013.01); *H01M 10/0525* (2013.01); *H01M 10/0561* (2013.01); H01M 2004/028 (2013.01); H01M 2220/20 (2013.01); H01M 2300/0037 (2013.01)

(58) Field of Classification Search
CPC ......... H01M 10/0567; H01M 10/0561; H01M 10/0525; H01M 4/131; H01M 4/505; H01M 4/525; H01M 4/628; H01M 2004/028; H01M 2220/20; H01M 2300/0037

See application file for complete search history.

(56) References Cited

U.S. PATENT DOCUMENTS

| | | | |
|---|---|---|---|
| 2007/0154815 A1 | 7/2007 | Kawasaki et al. | |
| 2016/0329613 A1* | 11/2016 | Kusachi | H01M 10/052 |
| 2017/0005369 A1* | 1/2017 | Nakagawa | H01M 4/133 |

FOREIGN PATENT DOCUMENTS

| | | |
|---|---|---|
| CN | 1894822 A | 1/2007 |
| CN | 102464649 A | 5/2012 |
| JP | 2012-094454 A | 5/2012 |
| JP | 2014-232704 A | 12/2014 |
| JP | 2017-010637 A | 1/2017 |

* cited by examiner

*Primary Examiner* — Laura Weiner
(74) *Attorney, Agent, or Firm* — Morgan, Lewis & Bockius LLP

(57) ABSTRACT

Provided is a lithium ion secondary battery including: a positive electrode having a positive electrode active material layer disposed on a positive electrode current collector; a negative electrode having a negative electrode active material layer disposed on a negative electrode current collector; a separator; and an electrolyte solution. The positive electrode active material layer includes a positive electrode active material containing lithium nickel composite oxide. The electrolyte solution contains a disulfonic acid compound as an additive. A mass of the disulfonic acid compound adsorbed on the positive electrode is 1.0 $g/m^2$ or less per unit surface area of the lithium nickel composite oxide.

20 Claims, 2 Drawing Sheets

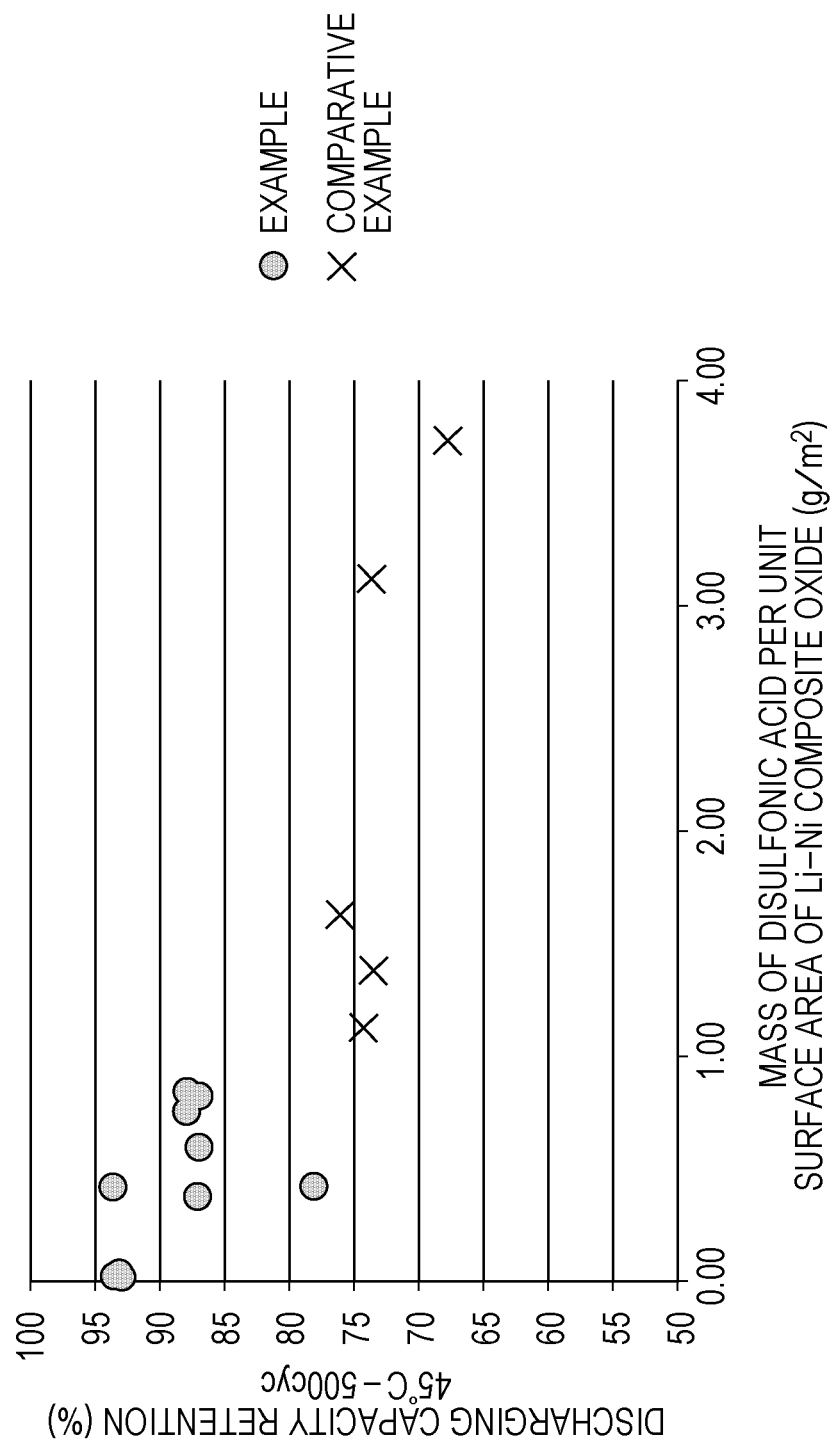

LITHIUM ION SECONDARY BATTERY

CROSS-REFERENCE TO RELATED APPLICATION

This application claims priority from Japanese Patent Application No. 2015-213796 filed with the Japan Patent Office on Oct. 30, 2015, the entire content of which is hereby incorporated by reference.

BACKGROUND

1. Technical Field

The present disclosure relates to nonaqueous electrolyte batteries, particularly to lithium ion secondary batteries.

2. Related Art

Nonaqueous electrolyte batteries have been put into practical use as batteries for vehicles including hybrid vehicles and electric vehicles. Lithium ion secondary batteries have been used as such on-vehicle batteries. Lithium ion secondary batteries have been required to have various characteristics: output characteristic, energy density, capacity, lifetime, and high-temperature stability. In particular, various improvements for the electrolyte solution have been attempted in order to enhance the battery life (cycle characteristic and preservation characteristic).

For example, JP-A-2012-94454 has suggested the battery employing the electrolyte solution containing cyclic disulfonic acid ester as the nonaqueous electrolyte solution. This electrolyte solution enables the battery to have the excellent rate characteristic after the preservation at high temperature. From the viewpoint of improving the cycle life of the battery, using the lithium nickel composite oxide as the positive electrode active material has been attempted.

SUMMARY

A lithium ion secondary battery according to an embodiment of the present disclosure includes: a positive electrode having a positive electrode active material layer disposed on a positive electrode current collector; a negative electrode having a negative electrode active material layer disposed on a negative electrode current collector; a separator; and an electrolyte solution. The positive electrode active material layer includes a positive electrode active material containing lithium nickel composite oxide. The electrolyte solution contains a disulfonic acid compound as an additive. A mass of the disulfonic acid compound adsorbed on the positive electrode is 1.0 g/m$^2$ or less per unit surface area of the lithium nickel composite oxide.

BRIEF DESCRIPTION OF THE DRAWINGS

FIG. 2 is a graph representing the relation between the discharging capacity retention and the mass of disulfonic acid (MMDS) per unit surface area of lithium nickel composite oxide.

DETAILED DESCRIPTION

Figure 1:
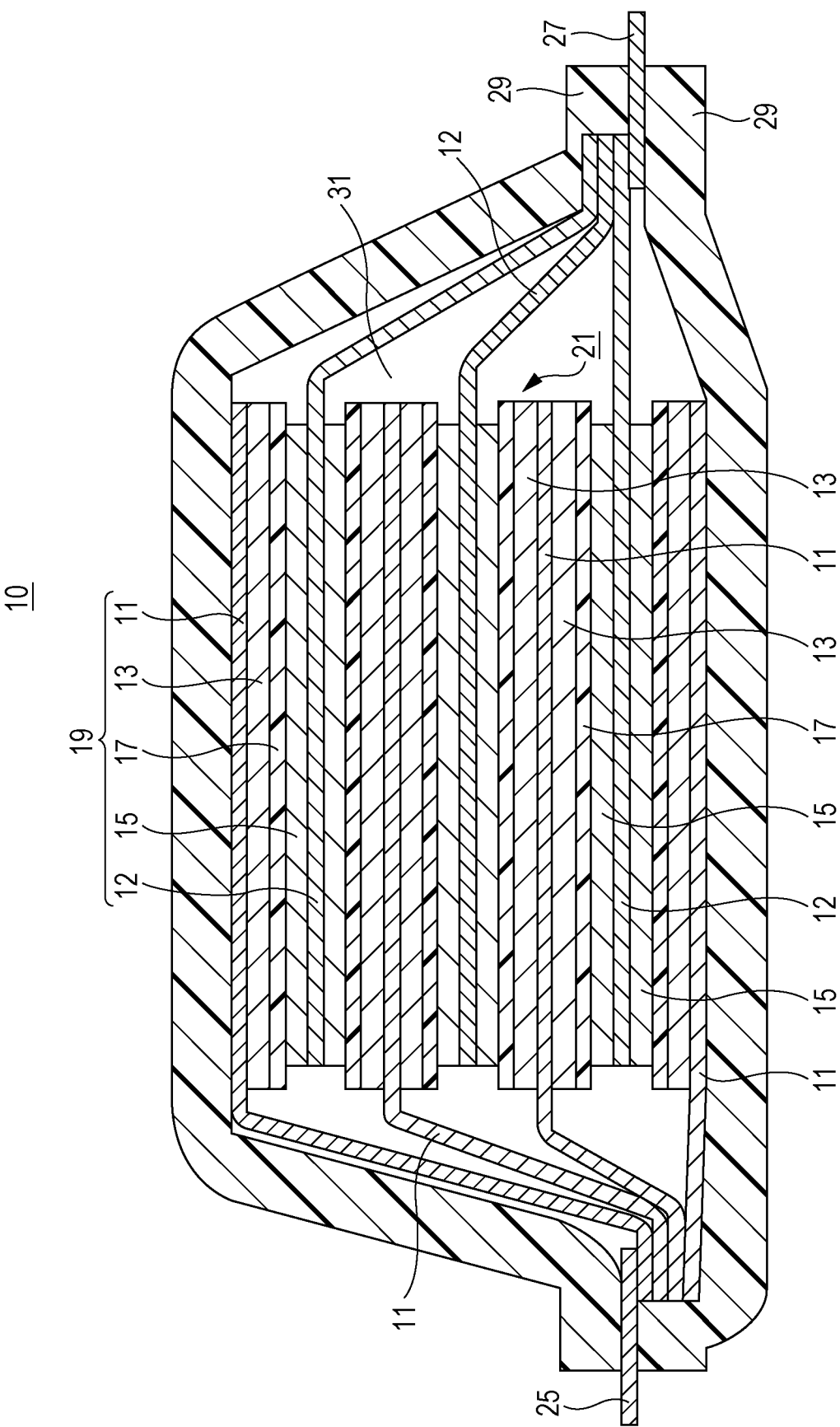
FIG. 1 is a schematic sectional view illustrating a lithium ion secondary battery according to one embodiment of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Some batteries including the positive electrode active material containing lithium nickel composite oxide employ the electrolyte solution containing the disulfonic acid ester compound such as methylene methanedisulfonate as the additive. It has been known that such batteries tend to have smaller capacity. The battery material may include a small amount of water. The disulfonic acid ester compound reacts with the water and then, the compound (disulfonic acid compound) is obtained. This disulfonic acid is adsorbed on the surface of the positive electrode to form the coating to protect the positive electrode. If, however, too much disulfonic acid is adsorbed, the lithium nickel composite oxide might be attacked, and this will result in the decrease in battery capacity. In view of this, it is an object of the present disclosure to provide a lithium ion secondary battery including a positive electrode active material containing lithium nickel composite oxide, whose decrease in capacity is prevented and whose discharging capacity retention (cycle characteristic and preservation life) is improved.

A lithium ion secondary battery according to an embodiment of the present disclosure includes a positive electrode having a positive electrode active material layer disposed on a positive electrode current collector, a negative electrode having a negative electrode active material layer disposed on a negative electrode current collector, a separator, and an electrolyte solution. The positive electrode active material layer includes the positive electrode active material containing the lithium nickel composite oxide, and the electrolyte solution contains the disulfonic acid compound as the additive. The lithium ion secondary battery according to the embodiment is featured in that the mass of the disulfonic acid compound adsorbed on the positive electrode per unit surface area of the lithium nickel composite oxide is 1.0 g/m$^2$ or less.

The lithium ion secondary battery according to the present disclosure has the high battery capacity and the excellent cycle characteristics. For these reasons, the battery has the longer preservation life.

An embodiment of the present disclosure will be described below. A positive electrode in this embodiment is a battery member with a shape like a thin plate or a sheet. This member includes a positive electrode active material layer formed by applying or rolling a mixture, which includes a positive electrode active material, binder, and if necessary a conductive agent, on a positive electrode current collector such as a metal foil and then drying the mixture. A negative electrode in this embodiment is a battery member with a shape like a thin plate or a sheet. This member includes a negative electrode active material layer formed by applying a mixture, which includes a negative electrode active material, binder, and if necessary a conductive agent, on a negative electrode current collector. The separator is a film-shaped battery member. This member separates between the positive electrode and the negative electrode to secure the conduction of lithium ions between the positive electrode and the negative electrode. The electrolyte solution is an electrically conductive solution obtained by dissolving an ionic substance in a solvent. In this embodiment, particularly a nonaqueous electrolyte solution can be used. The power generating element including the positive electrode, the negative electrode, and the separator constitutes one unit of the battery main components. In general, this power generating element is a stack having the positive electrode and the negative electrode stacked on each other with the separator interposed therebetween. In the lithium ion secondary battery according to the embodiment of the present disclosure, this stack is immersed in the electrolyte solution.

The lithium ion secondary battery according to the embodiment includes the package and the power generating element housed inside the package. Preferably, the power generating element is housed inside the sealed package. Here, "sealed" refers to the state that the power generating element is covered with the package material so that the power generating element is not exposed to the external air. That is to say, the package has a sealable bag-like shape that can house the power generating element inside.

Here, the positive electrode active material layer preferably includes the positive electrode active material containing a lithium nickel composite oxide. The lithium nickel composite oxide refers to a metal composite oxide containing lithium and nickel, which is represented by general formula $Li_xNi_yMe_{(1-y)}O_2$ (where Me represents at least one kind of metal selected from the group consisting of Al, Mn, Na, Fe, Co, Cr, Cu, Zn, Ca, K, Mg, and Pb).

The positive electrode active material layer can further include a positive electrode active material containing lithium manganese composite oxide. Examples of the lithium manganese composite oxide include lithium manganate ($LiMnO_2$) with a zigzag layered structure and spinel type lithium manganate ($LiMn_2O_4$). Using the lithium manganese composite oxide in combination enables the manufacture of the positive electrode at lower cost. In particular, the spinel type lithium manganate ($LiMn_2O_4$) that is superior in stability of crystal structure in the over-charged state is preferably used.

A preferred example of the electrolyte solution to be used in any embodiment of the present disclosure is a nonaqueous electrolyte solution, and example thereof is a mixture including a linear carbonate and a cyclic carbonate. Examples of the linear carbonate include dimethyl carbonate (hereinafter referred to as "DMC"), diethyl carbonate (hereinafter referred to as "DEC"), di-n-propyl carbonate, di-i-propyl carbonate, di-n-butyl carbonate, di-isobutyl carbonate, and di-t-butyl carbonate. Examples of the cyclic carbonate include propylene carbonate (hereinafter referred to as "PC") and ethylene carbonate (hereinafter referred to as "EC"). The electrolyte solution is obtained by dissolving a lithium salt such as lithium hexafluorophosphate ($LiPF_6$), lithium tetrafluoroborate ($LiBF_4$), or lithium perchlorate ($LiClO_4$) in such a carbonate mixture.

The electrolyte solution according to the embodiment can contain the additive. Examples of the additive that can be added to the electrolyte solution include a sulfur-containing additive. The sulfur-containing additive is electrochemically decomposed in the process of charging and discharging the battery. The decomposed additive provides the coating on the surface of the electrodes used in any embodiment to be described below. In this manner, the additive can stabilize the electrode structure. Examples of such an additive include a disulfonic acid compound. The disulfonic acid compound is a compound having two sulfo groups in one molecule. The disulfonic acid compound includes a disulfonate compound corresponding to a salt formed by sulfonic acid groups and metal ions, and a disulfonic acid ester compound including a sulfonic acid group forming the ester bond.

The disulfonic acid compound contained in the electrolyte solution is represented by the following formula:

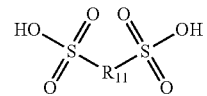

(where R11 is an alkylene group, an arylene group, or a combination of an alkylene group and an arylene group).

One or two of the sulfonic acid groups of the disulfonic acid compound may form the salt with the metal ions or may be in the anion state. Examples of the disulfonic acid compound include methanedisulfonic acid, 1,2-ethanedisulfonic acid, 1,3-propanedisulfonic acid, 1,4-butanedisulfonic acid, benzenedisulfonic acid, naphthalenedisulfonic acid, biphenyldisulfonic acid, salts thereof (such as lithium methanedisulfonate and lithium 1,3-ethanedisulfonate), and anions thereof (such as anions of methanedisulfonic acid and 1,3-ethanedisulfonic acid).

The disulfonic acid compound can be added to the electrolyte solution in the manufacture of the battery of this embodiment. Alternatively, the disulfonic acid ester compound having the sulfonic acid group forming the ester bond may be added to the electrolyte solution in the manufacture of the battery. The disulfonic acid ester compound reacts with water that exists in small amount inside the battery, thereby forming the disulfonic acid in the electrolyte solution. The disulfonic acid ester compound that can be added to the electrolyte solution in the manufacture of the battery corresponds to the compound having one or two sulfonic acid ester groups in one molecule. The disulfonic acid ester compound includes a chain compound represented by the following formula:

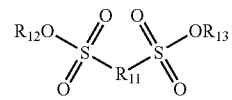

(where R11 represents an alkylene group, an arylene group, or a combination of an alkylene group and an arylene group, R12 represents an alkyl group or an aryl group, and R13 represents an alkyl group or an aryl group).

The disulfonic acid ester compound includes a cyclic compound represented by the following formula:

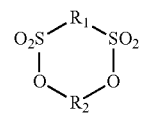

(where R1 represents an alkylene group, an arylene group, or a combination of an alkylene group and an arylene group, and R2 represents an alkylene group, an arylene group, or a combination of an alkylene group and an arylene group).

Examples of the disulfonic acid ester compound include the chain disulfonic acid esters such as methanedisulfonic acid, 1,2-ethanedisulfonic acid, 1,3-propanedisulfonic acid, 1,4-butanedisulfonic acid, benzenedisulfonic acid, naphthalenedisulfonic acid, and alkyl diester and aryl diester of biphenyldisulfonic acid. Other examples include cyclic disulfonic acid ester such as methylene methanedisulfonate, ethylene methanedisulfonate, and propylene methanedisulfonate. Methylene methanedisulfonate (hereinafter "MMDS") is particularly preferable.

If the cyclic disulfonic acid ester compound is added to the electrolyte solution in the manufacture of the battery, the cyclic disulfonic acid ester compound will react with the water that may exist in the battery, thereby generating the disulfonic acid compound. The scheme of the generation of the disulfonic acid compound is hereinafter described. As represented by the formula below, the cyclic disulfonic acid ester compound (1) reacts with water to generate the disulfonic acid compound (2). The disulfonic acid compound (2) with the acid property is adsorbed on the surface of the positive electrode with the alkaline property including the positive electrode active material containing the lithium nickel composite oxide, thereby forming the positive electrode coating (3). The coating formed as appropriate on the positive electrode surface is particularly preferable because the exit of the element such as manganese from the positive electrode active material can be suppressed.

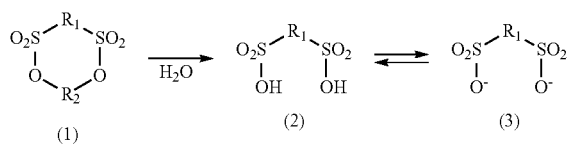

(Wherein R1 represents an alkylene group, an arylene group, or a combination of an alkylene group and an arylene group, and R2 represents an alkylene group, an arylene group, or a combination of an alkylene group and an arylene group.)

If, however, the compound (3) exists on the surface of the positive electrode in too large amount, this compound will attack the lithium nickel composite oxide itself. This may result in the increase in resistance in the positive electrode and the decrease in capacity. In view of this, in this embodiment, the mass of the disulfonic acid compound adsorbed on the positive electrode is set to 1.0 g/m² or less per unit surface area of the lithium nickel composite oxide. That is to say, the exit of the element such as manganese is suppressed by keeping the amount of disulfonic acid compound in the positive electrode active material proper. Moreover, the increase in internal resistance and the decrease in capacity can be prevented. Here, the term "surface area of lithium nickel composite oxide" refers to, if the composite oxide has the particulate shape, the surface area of the lithium nickel composite oxide particle. In this case, the surface area of the composite oxide corresponds to the surface area calculated from the specific surface area of the composite oxide particle that can be measured by the normal method for measuring the specific surface area of the particle, such as the BET method, and the weight of the lithium nickel composite oxide. The surface area does not refer to the area of the positive electrode plate. The disulfonic acid compound forms the coating by being adsorbed not just on the surface of the positive electrode but also on the inside of the positive electrode active material, i.e., between the positive electrode active material particles and into the space of the positive electrode active material crystal. Thus, in this embodiment, the amount of disulfonic acid to be present per unit surface area of the lithium nickel composite oxide is defined.

Here, the positive electrode active material included in the positive electrode active material layer preferably includes the lithium nickel manganese cobalt composite oxide with a layered crystal structure, which is represented by the general formula $Li_xNi_yCo_zMn_{(1-y-z)}O_2$. In the general formula, x is a numeral satisfying $1 \le x \le 1.2$, y and z are positive numerals satisfying $y+z<1$, and y is 0.5 or less. Containing more manganese makes it difficult to form composite oxide with a single phase. In view of this, the relation of $1-y-z \le 0.4$ is desirably satisfied. Containing more cobalt results in cost increase and capacity decrease. In view of this, the relations of $z<y$ and $z<1-y-z$ are desirably satisfied. To realize the battery with the high capacity, it is particularly preferable to satisfy $y>1-y-z$ and $y>z$.

If the positive electrode active material layer further includes the positive electrode active material containing the lithium manganese composite oxide, the mass of the disulfonic acid compound adsorbed on the positive electrode is preferably 0.04 to 0.6 g/m² per unit surface area of the lithium manganese composite oxide. As described above, the disulfonic acid compound existing in the positive electrode active material can suppress the exit of the element such as manganese from the positive electrode. The increase in internal resistance and the decrease in capacity can be prevented. Thus, it is preferable that the mass of the disulfonic acid compound adsorbed on the positive electrode per unit surface area of the lithium manganese composite oxide is kept proper. Here, the term "surface area of lithium manganese composite oxide" refers to the specific surface area of the lithium manganese composite oxide particle. That is to say, the surface area of the composite oxide corresponds to the surface area calculated from the specific surface area of the composite oxide that can be measured by the normal method for measuring the specific surface area of the particle, such as the BET method, and the weight of the lithium manganese composite oxide. The surface area does not refer to the area of the positive electrode plate. The disulfonic acid compound forms the coating by being adsorbed not just on the surface of the positive electrode but also on the inside of the positive electrode active material, i.e., between the positive electrode active material particles and into the space of the positive electrode active material crystal. Thus, in this embodiment, the amount of disulfonic acid existing per unit surface area of the lithium manganese composite oxide is defined.

In another embodiment, the positive electrode active material layer may include the positive electrode active material containing only the lithium manganese composite oxide. When the positive electrode active material layer includes the positive electrode active material containing only the lithium manganese composite oxide, lithium manganate ($LiMnO_2$) with the zigzag layered structure or spinel type lithium manganate ($LiMn_2O_4$) can be used. It is particularly preferable that the spinel type lithium manganate ($LiMn_2O_4$) is used alone. As described above, the disulfonic acid compound derived from the electrolyte solution existing in the positive electrode active material can suppress the exit of the element such as manganese from the positive electrode. In addition, the increase in internal resistance and the decrease in capacity can be prevented. Thus, when the positive electrode active material containing the lithium manganese composite oxide is used, it is particularly preferable that the mass of the disulfonic acid compound adsorbed on the positive electrode per unit surface area of the lithium manganese composite oxide is kept proper.

The electrolyte solution may include the cyclic carbonate compound with an unsaturated bond as the additive. The cyclic carbonate compound with an unsaturated bond is an additive for forming the protective coating for the positive electrode and the negative electrode in the process of charging and discharging the battery, which is similar to the disulfonic acid compound and the disulfonic acid ester compound described above. In particular, the cyclic carbonate compound with the unsaturated bond can prevent the sulfur-containing compound such as the disulfonic acid compound or the disulfonic acid ester compound from attacking the positive electrode active material containing the lithium nickel composite oxide. Examples of the cyclic carbonate compound with the unsaturated bond include vinylene carbonate, vinyl ethylene carbonate, propylene carbonate methacrylate, and propylene carbonate acrylate. The cyclic carbonate compound with the unsaturated bond is particularly preferably vinylene carbonate (hereinafter "VC").

The electrolyte solution may further contain a cyclic carbonate compound with a halogen as the additive. The cyclic carbonate compound with a halogen is also the compound forming the protective coating for the positive electrode and the negative electrode in the process of charging and discharging the battery. In particular, the cyclic carbonate compound with a halogen can prevent the sulfur-containing compound such as the disulfonic acid compound or the disulfonic acid ester compound from attacking the positive electrode active material containing the lithium nickel composite oxide. Examples of the cyclic carbonate compound with a halogen include fluoroethylene carbonate, difluoroethylene carbonate, trifluoroethylene carbonate, chloroethylene carbonate, dichloroethylene carbonate, and trichloroethylene carbonate. The cyclic carbonate compound with a halogen is particularly preferably fluoroethylene carbonate (hereinafter "FEC"). When the electrolyte solution contains the cyclic carbonate compound with the unsaturated bond and/or the cyclic carbonate compound with the halogen, it is preferable that the total mass of the cyclic carbonate compound with the unsaturated bond and the cyclic carbonate compound with the halogen contained in the electrolyte solution per unit surface area of the lithium nickel composite oxide is more than the mass of the disulfonic acid compound adsorbed on the positive electrode per unit surface area thereof. When the mass of the cyclic carbonate compounds is more than the mass of the disulfonic acid compound, the exit of the element such as manganese from the positive electrode active material can be suppressed effectively.

The additive to the electrolyte solution is selected from the sulfur-containing compounds such as the disulfonic acid compound or the disulfonic acid ester compound, the cyclic carbonate compound with the unsaturated bond, the cyclic carbonate compound with the halogen, and the mixture thereof. The additive is added to the electrolyte solution by 15 wt % or less, preferably 10 wt % or less, and more preferably 5 wt % or less relative to the entire weight of the electrolyte solution in the preparation of the electrolyte solution.

The negative electrode that can be used in any embodiment includes a negative electrode active material layer including a negative electrode active material disposed on a negative electrode current collector. Preferably, the negative electrode includes the negative electrode active material layer obtained by applying or rolling a mixture, which includes the negative electrode active material, binder, and a conductive agent added as necessary, onto the negative electrode current collector including a metal foil such as a copper foil, and then drying the mixture. In each embodiment, the negative electrode active material preferably includes graphite particles and/or amorphous carbon particles. If a mixed carbon material including both graphite particles and amorphous carbon particles is used, the regeneration performance of the battery is improved.

Graphite is a hexagonal crystal carbon material having the hexagonal-plate-like crystal structure. Graphite is also called black lead or the like. The preferred shape of the graphite is particle. Amorphous carbon may have a structure partly similar to graphite. Amorphous carbon refers to a carbon material that is amorphous as a whole, having a microcrystalline structure forming a network randomly. Examples of the amorphous carbon include carbon black, cokes, activated carbon, carbon fiber, hard carbon, soft carbon, and mesoporous carbon. The preferred shape of the amorphous carbon is particle.

Examples of the conductive agent used as necessary for the negative electrode active material layer include carbon materials, for example, carbon fiber such as carbon nanofiber, carbon blacks such as acetylene black and Ketjen black, activated carbon, mesoporous carbon, fullerenes, and carbon nanotube. Additionally, the negative electrode active material layer may contain additives usually used for forming the electrode, such as thickener, dispersant, and stabilizer.

Examples of the binder used for the negative electrode active material layer include: fluorine resins such as polyvinylidene fluoride (PVDF), polytetrafluoroethylene (PTFE), and polyvinyl fluoride (PVF); conductive polymers such as polyanilines, polythiophenes, polyacetylenes, and polypyrroles; synthetic rubber such as styrene butadiene rubber (SBR), butadiene rubber (BR), chloroprene rubber (CR), isoprene rubber (IR), and acrylonitrile butadiene rubber (NBR); and polysaccharides such as carboxymethyl cellulose (CMC), xanthan gum, guar gum, and pectin.

The positive electrode that can be used in any embodiment includes the positive electrode active material layer including a positive electrode active material disposed on a positive electrode current collector. Preferably, the positive electrode includes the positive electrode active material layer obtained by applying or rolling a mixture, which includes the positive electrode active material, binder, and a conductive agent added as necessary, onto the positive electrode current collector including a metal foil such as an aluminum foil, and then drying the mixture.

Examples of the conductive agent that may be used for the positive electrode active material layer include carbon materials, for example, carbon fiber such as carbon nanofiber, carbon blacks such as acetylene black and Ketjen black, activated carbon, graphite, mesoporous carbon, fullerenes, and carbon nanotube. In addition, the positive electrode active material layer may contain additives that are usually used for forming the electrode, such as thickener, dispersant, and stabilizer.

Examples of the binder used for the positive electrode active material layer include: fluorine resins such as polyvinylidene fluoride (PVDF), polytetrafluoroethylene (PTFE), and polyvinyl fluoride (PVF); conductive polymers such as polyanilines, polythiophenes, polyacetylenes, and polypyrroles; synthetic rubber such as styrene butadiene rubber (SBR), butadiene rubber (BR), chloroprene rubber (CR), isoprene rubber (IR), and acrylonitrile butadiene rubber (NBR); and polysaccharides such as carboxymethyl cellulose (CMC), xanthan gum, guar gum, and pectin.

In this embodiment, preferably, the content of water relative to the weight of the lithium nickel composite oxide in the positive electrode active material is as small as possible. The content of water is, for example, 400 ppm or less. As described above, the water that may be contained in the positive electrode active material promotes the decomposition of the additive in the electrolyte solution and thus the coating for the positive electrode is formed. The water does not lead to any problem as long as the amount thereof is appropriate. When the water is too much, the gas generation from the additive in the electrolyte solution may be promoted. For this reason, the amount of water is desirably adjusted to be appropriate by reducing the water in the positive electrode active material as much as possible. In the process of handling the positive electrode active material and manufacturing the positive electrode, the unintended mixing of water into the positive electrode active material is unavoidable. However, if the water is contained by approximately 400 ppm relative to the weight of the lithium nickel composite oxide, the effect of promoting the gas generation can be suppressed.

The separator to be used in any embodiment includes an olefin resin layer. The olefin resin layer is a layer containing polyolefin obtained by polymerizing or co-polymerizing α-olefin. Examples of such α-olefin include ethylene, propylene, butene, pentene, and hexene. In the embodiment, the olefin resin layer is preferably a layer with a structure having pores closed when the battery temperature has increased, i.e., porous or microporous polyolefin. With the olefin resin layer having such a structure, the separator is closed (shutdown) upon the increase in battery temperature, thereby stopping the ion flow. In order to achieve the shutdown effect, it is particularly preferable to use the porous polyethylene film. The separator may include a heat-resistant microparticle layer. With the heat-resistant microparticle layer, the stop of the battery function by the heat generation from the battery can be prevented. The heat-resistant microparticle layer includes a stable inorganic microparticle with heat resistance that resists a temperature of 150° C. or higher and uneasily reacts electrochemically. Examples of such a heat-resistant inorganic microparticle include inorganic oxide such as silica, alumina (α-alumina, (β-alumina, and θ-alumina), iron oxide, titanium oxide, barium titanate, and zirconium oxide, and minerals such as boehmite, zeolite, apatite, kaolin, spinel, mica, and mullite. The separator including the heat-resistant resin layer is generally referred to as "ceramic separator."

Here, a structure example of the lithium ion secondary battery according to the embodiment is described with reference to the drawing. The drawing illustrates an example of a cross section of the lithium ion secondary battery. A lithium ion secondary battery 10 includes, as main components, a negative electrode current collector 11, a negative electrode active material layer 13, a separator 17, a positive electrode current collector 12, and a positive electrode active material layer 15. In the drawing, the negative electrode active material layer 13 is provided on each surface of the negative electrode current collector 11. The positive electrode active material layer 15 is provided on each surface of the positive electrode current collector 12. Note that the active material layer may alternatively be formed on only one surface of each current collector. The negative electrode current collector 11, the positive electrode current collector 12, the negative electrode active material layer 13, the positive electrode active material layer 15, and the separator 17 constitute one battery unit, i.e., a power generating element (unit cell 19 in the drawing). A plurality of unit cells 19 is stacked with the separator 17 interposed therebetween. Extension portions extending from the negative electrode current collectors 11 are collected and bonded onto a negative electrode lead 25. Extension portions extending from the positive electrode current collectors 12 are collected and bonded onto a positive electrode lead 27. The positive electrode lead is preferably an aluminum plate and the negative electrode lead is preferably a copper plate. In some cases, the positive electrode lead and the negative electrode lead may be partly coated with another metal (such as nickel, tin, or solder) or a polymer material. The positive electrode lead and the negative electrode lead are welded to the positive electrode and the negative electrode, respectively. The battery including the stacked unit cells is covered with a package 29 with the welded negative electrode lead 25 and positive electrode lead 27 led out of the battery. An electrolyte solution 31 is poured into the package 29. The package 29 has a shape obtained by heat-sealing the periphery of the two stacks.

The capacity of the lithium ion secondary battery according to this embodiment is preferably 5 Ah or more and 70 Ah or less, more preferably 30 Ah or more and 60 Ah or less. The lithium ion battery with the capacity in this range is useful particularly as the battery to be mounted in the vehicle or the stationary battery. Such batteries are required to have the high capacity retention. Thus, using the battery according to this embodiment in the above application is very advantageous.

EXAMPLES

Manufacture of Negative Electrode: Examples and Comparative Examples

Graphite powder with a BET specific surface area of 3.4 $m^2/g$ was used as the negative electrode active material. This graphite powder, carbon black powder (hereinafter referred to as "CB") with a BET specific surface area of 62 $m^2/g$ as the conductive agent, and carboxymethyl cellulose (hereinafter referred to as "CMC") and styrene butadiene copolymer latex (hereinafter referred to as "SBR") as the binder resin were mixed in a solid content mass ratio of CB:CMC:SBR=0.3:1.0:2.0. The resulting mixture was added to the ion-exchanged water and the mixture containing the ion-exchanged water was stirred. This provided a slurry having these materials uniformly dispersed in water. The slurry was applied onto a 10-μm-thick copper foil to serve as a negative electrode current collector. Next, the electrode was heated for 10 minutes at 125° C. to vaporize water. Thus, the negative electrode active material layer was formed. The negative electrode active material layer was pressed to manufacture the negative electrode having the negative electrode active material layer applied onto one surface of the negative electrode current collector.

<Manufacture of Positive Electrode: Examples and Comparative Examples>

Lithium carbonate ($Li_2CO_3$), nickel hydroxide ($Ni(OH)_2$), cobalt hydroxide ($Co(OH)_2$), and manganese hydroxide ($Mn(OH)_2$) were mixed at a predetermined molar ratio so that the total amount of LiOH and $Li_2CO_3$ after the burning became 1.0 wt % or less. The resulting mixture was burned for 20 hours at 750° C. in the dry atmosphere. This lithium nickel composite oxide was pulverized, so that lithium nickel composite oxide (nickel cobalt lithium manganate (NCM523, nickel:cobalt:manganese=5:2:3, lithium/metal excluding lithium ratio=1.04, a BET specific surface area 22 $m^2/g$)) with an average particle diameter of 9 μm was obtained. The lithium nickel composite oxide (CO), CB which has a BET specific surface area of 62 $m^2/g$, carbon black powder (GR) which has a BET specific surface area of 22 $m^2/g$ as the conductive agent, and polyvinylidene fluoride (PVDF) as the binder resin were added to N-methylpyrrolidone as a solvent (hereinafter referred to as "NMP") at CO:CB:GR:PVDF=93:3:1:3 in a solid content mass ratio. In addition, oxalic anhydride (molecular weight: 90) as an organic moisture scavenger was added to this mixture by 0.03 parts by mass relative to 100 parts by mass of the solid content of the mixture excluding the NMP. The mixture including oxalic anhydride was planetary mixed and dispersed for 30 minutes to prepare a slurry having these materials dispersed uniformly. The slurry was applied onto a 20-μm-thick aluminum foil as a positive electrode current collector. Next, the electrode was heated for 10 minutes at 125° C., thereby vaporizing NMP. Thus, the positive electrode active material layer was formed. In addition, the positive electrode active material layer was pressed, thereby forming the positive electrode with the positive electrode active material layer applied on one surface of the positive electrode current collector.

Furthermore, a mixed oxide (MO) formed by mixing the lithium nickel composite oxide obtained by the other positive electrode active material being formed and a lithium manganese oxide ($LiMn_2O_4$) at 70:30 (weight ratio), CB which has a BET specific surface area of 62 $m^2/g$, carbon black powder (GR) which has a BET specific surface area of 22 $m^2/g$ as the conductive agent, and polyvinylidene fluoride (PVDF) as the binder resin were added to NMP as a solvent at MO:CB:GR:PVDF=93:3:1:3 in a solid content mass ratio. In addition, oxalic anhydride (molecular weight: 90) as an organic moisture scavenger was added to this mixture by 0.03 parts by mass relative to 100 parts by mass of the solid content of the mixture excluding the NMP. The mixture including oxalic anhydride was planetary mixed and dispersed for 30 minutes to prepare a slurry having these materials dispersed uniformly. The slurry was applied onto a 20-μm-thick aluminum foil as a positive electrode current collector. Next, the electrode was heated for 10 minutes at 125° C., thereby vaporizing NMP. Thus, the positive electrode active material layer was formed. In addition, the positive electrode active material layer was pressed, thereby forming the positive electrode with the positive electrode active material layer applied on one surface of the positive electrode current collector.

<Separator>

A ceramic separator including a heat-resistant microparticle layer including alumina as the heat-resistant microparticle and an olefin resin layer including polypropylene with a thickness of 25 μm was used.

<Electrolyte Solution>

For preparing the nonaqueous electrolyte solution, ethylene carbonate (hereinafter referred to as "EC"), diethyl carbonate (hereinafter referred to as "DEC"), and ethyl methyl carbonate (hereinafter referred to as "EMC") were mixed at EC:DEC:EMC=30:60:10 (volume ratio). To this nonaqueous solvent, lithium hexafluorophosphate (LiPF6) as the electrolyte salt was dissolved at a concentration of 0.9 mol/L. To the resulting solution, methylene methanedisulfonate (MMDS), vinylene carbonate (VC), and fluoroethylene carbonate (FEC) as the additive were dissolved; thus, the electrolyte solution was obtained. The mass of each of MMDS, VC, and FEC per unit surface area of the lithium nickel composite oxide as the positive electrode active material was adjusted to be the prepared amount shown in Table 1.

<Assembly of Lithium Ion Secondary Battery>

A rectangle with a predetermined size was cut out of each of the negative electrode and the positive electrode manufactured as above. In a portion thereof on which coating was not applied for connecting the terminal, a positive electrode lead terminal made of aluminum was welded with ultrasonic waves. Similarly, a negative electrode lead terminal made of nickel with the same size as the positive electrode lead terminal was welded with ultrasonic waves to a portion of the negative electrode plate on which coating was not applied. The negative electrode plate and the positive electrode plate were disposed on both surfaces of the porous polypropylene separator in a state that the active material layers are stacked with the separator interposed therebetween; thus, the electrode plate stack was obtained. Except one long side of the two aluminum laminate films, the other three sides were attached through heat-sealing. Thus, a bag-shaped package was manufactured. Into the bag-shaped package, the electrode stack was inserted. Next, the electrode stack was vacuum impregnated with the electrolyte solution poured into the package. Then, the opening was heat-sealed under reduced pressure. Thus, a stacked lithium ion battery was assembled. The stacked lithium ion battery was used to perform high-temperature aging a plurality of times and thus assembly of a stacked lithium ion battery was completed.

<Initial Charging and Discharging>

The constant-current constant-voltage charging was performed at a current of 1 C with an upper voltage of 4.15 V under an atmosphere temperature of 25° C. until the residual capacity of the above assembled lithium ion secondary battery (hereinafter referred to as "SOC", state of charge) became 100% from 0%. Next, the constant-current discharging was performed at a current of 1 C until the SOC became 0%. Accordingly, the lithium ion secondary battery according to the embodiment of the present disclosure was obtained.

<Measurement of Amount of Cyclic Carbonate Compound with the Unsaturated Bond (VC, FEC) in the Electrolyte Solution>

The lithium ion secondary battery having been subjected to the initial charging and discharging was disassembled. The amount of cyclic carbonate compounds (VC, FEC) contained in the electrolyte solution extracted from the battery was measured by the nuclear magnetic resonance (NMR). The mass of each cyclic carbonate per unit surface area of the lithium nickel composite oxide and the mass of each cyclic carbonate contained in the electrolyte solution per unit surface area of the lithium manganese composite oxide are shown as the residual amount in Table 1.

<Measurement of Disulfonic Acid Compound (MMDS) Adsorbed on the Positive Electrode>

The lithium ion secondary battery having been subjected to the initial charging and discharging was disassembled. The amount of the disulfonic acid compound adsorbed on the positive electrode was measured by the nuclear magnetic resonance (NMR). The mass of the disulfonic acid adsorbed on the positive electrode per unit surface area of the lithium nickel composite oxide and the mass of the disulfonic acid adsorbed on the positive electrode per unit surface area of the lithium manganese composite oxide are shown as the residual amount in Table 1.

<Measurement of Specific Surface Area of Composite Oxide>

The specific surface area of the composite oxide contained in the positive electrode active material was measured based on the nitrogen adsorption by the BET method.

<Calculation of Surface Area of Lithium Nickel Composite Oxide of Positive Electrode>

The surface area of lithium nickel composite oxide of the positive electrode was calculated using the following formula:

Surface area of lithium nickel composite oxide of positive electrode ($m^2$)=specific surface area of lithium nickel composite oxide of positive electrode active material (m²/g)×weight of lithium nickel composite oxide of positive electrode (g)

<Calculation of Surface Area of Lithium Manganese Composite Oxide of Positive Electrode>

The surface area of the lithium manganese composite oxide of the positive electrode was calculated using the following formula:

Surface area of lithium manganese composite oxide of positive electrode (m²)=specific surface area of lithium manganese composite oxide of positive electrode active material (m²/g)×weight of lithium manganese composite oxide of positive electrode (g)

<Measurement of Amount of Moisture>

The amount of moisture in the positive electrode active material was measured based on a Karl Fischer method.

<Cycle Characteristic Test>

The lithium ion secondary battery obtained by the above method is repeatedly charged and discharged under the 45° C. environment. That is to say, the constant-current constant-voltage charging with a current of 1 C and an upper-limit voltage of 4.15 V followed by the constant-current discharging with a current of 1 C and a lower-limit end voltage of 2.5 V constitute one charging-discharging cycle, and such a cycle was repeated 500 times. Subsequently, another charging-discharging cycle including the constant-current constant-voltage charging with a current of 1 C and an upper-limit voltage of 4.15 V followed by the constant-current discharging with a current of 0.2 C and a lower-limit end voltage of 2.5 V was repeated 500 times under the 25° C. environment. Then, the discharging capacity retention (%) after the 500 cycles was measured.

active material was plotted (FIG. 2). As Table 1 shows, the residual amount of each additive per unit surface area of the composite oxide contained in the positive electrode active material can be changed by adjusting the amount of additive prepared in the electrolyte solution. As FIG. 2 indicates, the high discharging capacity retention of the battery is maintained by adjusting the mass of the disulfonic acid compound per unit surface area of the lithium nickel composite oxide as appropriate. By controlling the degree of forming the coating on the positive electrode active material with the additive added to the electrolyte solution within the preferable range, the battery with the high discharging capacity retention, i.e., the battery with the high cycle characteristic and the long preservation life can be obtained.

The examples of the present disclosure have been described so far. The examples above, however, merely represent some of the embodiments of the present disclosure. Limiting the technical range of the present disclosure to the particular embodiment or the specific structure is not intended by the examples.

The lithium ion secondary battery according to the embodiment of the present disclosure may be any of the following first to seventh lithium ion secondary batteries.

The first lithium ion secondary battery is a lithium ion secondary battery including a power generating element in a package, the power generating element including: a positive electrode having a positive electrode active material layer disposed on a positive electrode current collector; a negative electrode having a negative electrode active material layer disposed on a negative electrode current collector; a separator; and an electrolyte solution. The positive electrode active material layer includes lithium nickel composite

TABLE 1

| | Residual amount | | | | Prepared amount | | | |
| --- | --- | --- | --- | --- | --- | --- | --- | --- |
| | Mass of disulfonic acid per unit surface area of Li—Ni composite oxide (MMDS) (g/m²) | Mass of disulfonic acid per unit surface area of Li—Mn composite oxide (MMDS) (g/m²) | Mass of total carbonates per unit surface area of Li—Ni composite oxide (VC + FEC) (g/m²) | Mass of total carbonates per unit surface area of Li—Mn composite oxide (VC + FEC) (g/m²) | Mass of disulfonic acid per unit surface area of Li—Ni composite oxide (MMDS) (g/m²) | Mass of carbonate per unit surface area of Li—Ni composite oxide (VC) (g/m²) | Mass of carbonate per unit surface area of Li—Ni composite oxide (FEC) (g/m²) | Discharging capacity retention (%) |
| Example 1 | 0.01 | 0.04 | 1.51 | 5.44 | 0.80 | 1.50 | 1.00 | 93.0 |
| Example 2 | 0.03 | 0.11 | 0.33 | 1.31 | 1.12 | 0.37 | 0.47 | 93.2 |
| Example 3 | 0.41 | 0.07 | 0.44 | 1.76 | 0.66 | 0.47 | 1.12 | 93.8 |
| Example 4 | 0.01 | 0.04 | 0.39 | 1.57 | 0.94 | 0.66 | 0.47 | 93.6 |
| Example 5 | 0.75 | 0.28 | 3.21 | 1.21 | 4.36 | 2.18 | 1.87 | 88.0 |
| Example 6 | 0.59 | 0.16 | 0.00 | 0.00 | 5.72 | 0.00 | 0.00 | 87.1 |
| Example 7 | 0.82 | 0.22 | 0.00 | 0.00 | 6.54 | 0.00 | 0.00 | 87.0 |
| Example 8 | 0.84 | 0.32 | 3.08 | 1.17 | 4.36 | 2.18 | 1.87 | 88.0 |
| Example 9 | 0.81 | 0.53 | 2.52 | 1.65 | 4.35 | 0.00 | 3.11 | 87.3 |
| Example 10 | 0.37 | 0.24 | 2.89 | 1.90 | 3.73 | 0.00 | 3.11 | 87.2 |
| Example 11 | 0.41 | 0.02 | 0.00 | 0.00 | 6.52 | 0.00 | 0.00 | 78.2 |
| Comparative Example 1 | 1.63 | 0.02 | 0.00 | 0.00 | 13.04 | 0.00 | 0.00 | 76.2 |
| Comparative Example 2 | 3.12 | 0.01 | 0.00 | 0.00 | 18.05 | 0.00 | 0.00 | 73.8 |
| Comparative Example 3 | 1.13 | 0.00 | 3.21 | 1.20 | 10.86 | 2.43 | 2.43 | 74.3 |
| Comparative Example 4 | 1.38 | 0.08 | 3.49 | 1.72 | 7.25 | 2.42 | 2.07 | 73.6 |
| Comparative Example 5 | 3.73 | 0.68 | 0.00 | 0.00 | 19.73 | 0.00 | 0.00 | 67.8 |

The relation between the discharging capacity retention and the mass of the disulfonic acid compound adsorbed on the positive electrode per unit surface area of the lithium nickel composite oxide included in the positive electrode oxide as a positive electrode active material. The electrolyte solution contains a disulfonic acid compound. The mass of the disulfonic acid compound is 1.0 g/m² or less relative to the surface area of the lithium nickel composite oxide.

The second lithium ion secondary battery is the first lithium ion secondary battery configured such that the positive electrode active material layer further includes lithium manganese composite oxide as the positive electrode active material and the mass of the disulfonic acid compound is 0.04 to 0.6 g/m² relative to the surface area of the lithium manganese composite oxide.

The third lithium ion secondary battery is the first or second lithium ion secondary battery configured such that the lithium nickel composite oxide includes as the positive electrode active material, lithium nickel cobalt manganese composite oxide with a layered crystal structure, which is represented by a general formula $Li_xNi_yCo_zMn_{(1-y-z)}O_2$.

The fourth lithium ion secondary battery is any of the first to third lithium ion secondary batteries, configured such that the lithium manganese composite oxide is $LiMn_2O_4$.

The fifth lithium ion secondary battery is any of the first to fourth lithium ion secondary batteries configured such that the electrolyte solution further contains a cyclic carbonate compound with an unsaturated bond and the mass of the cyclic carbonate with the unsaturated bond relative to the surface area of the lithium nickel composite oxide is more than the mass of the disulfonic acid compound.

The sixth lithium ion secondary battery is any of the first to fifth lithium ion secondary batteries configured such that the disulfonic acid compound is methylene methanedisulfonate.

The seventh lithium ion secondary battery is any of the first to sixth lithium ion secondary batteries configured such that a capacity of the lithium ion secondary battery is 5 Ah or more and 70 Ah or less.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A lithium ion secondary battery comprising:
    a positive electrode having a positive electrode active material layer disposed on a positive electrode current collector;
    a negative electrode having a negative electrode active material layer disposed on a negative electrode current collector;
    a separator; and
    an electrolyte solution, wherein
    the positive electrode active material layer includes a positive electrode active material containing lithium nickel cobalt manganese composite oxide having a layered crystal structure and is represented by a general formula $Li_xNi_yCo_zMn_{(1-y-z)}O_2$ in which x satisfies $1 \leq x \leq 1.2$, y and z are positive numerals satisfying $y+z<1$, and y is 0.5 or less and greater than 0,
    the electrolyte solution contains a disulfonic acid compound as an additive,
    the disulfonic acid compound is selected from the group consisting of methanedisulfonic acid, 1,2-ethanedisulfonic acid, 1,3-propanedisulfonic acid, 1,4-butanedisulfonic acid, benzenedisulfonic acid, naphthalenedisulfonic acid, and biphenyldisulfonic acid, and
    a mass of the disulfonic acid compound adsorbed on the positive electrode is 0.01 g/m² or more and 1.0 g/m² or less per unit surface area of the lithium nickel cobalt manganese composite oxide.

2. The lithium ion secondary battery according to claim 1, wherein the disulfonic acid compound is naphthalenedisulfonic acid.

3. The lithium ion secondary battery according to claim 1, wherein the disulfonic acid compound is methanedisulfonic acid.

4. The lithium ion secondary battery according to claim 1, wherein the disulfonic acid compound is 1,2-ethanedisulfonic acid.

5. The lithium ion secondary battery according to claim 1, wherein the disulfonic acid compound is 1,3-propanedisulfonic acid.

6. The lithium ion secondary battery according to claim 1, wherein the disulfonic acid compound is 1,4-butanedisulfonic acid.

7. The lithium ion secondary battery according to claim 1, wherein the disulfonic acid compound is benzenedisulfonic acid.

8. The lithium ion secondary battery according to claim 1, wherein the disulfonic acid compound is biphenyldisulfonic acid.

9. The lithium ion secondary battery according to claim 1, wherein a sulfonic acid groups of the disulfonic acid compound forms a salt with lithium ion.

10. The lithium ion secondary battery according to claim 1, wherein
    the electrolyte solution further contains as an additive, a cyclic carbonate compound with an unsaturated bond and/or a cyclic carbonate compound with a halogen, and
    a total mass of the cyclic carbonate compound with the unsaturated bond and the cyclic carbonate compound with the halogen contained in the electrolyte solution per unit surface area of the lithium nickel composite oxide is more than the mass of the disulfonic acid compound adsorbed on the positive electrode per unit surface area of the lithium nickel composite oxide.

11. The lithium ion secondary battery according to claim 1, a capacity of the lithium ion secondary battery is 5 Ah or more and 70 Ah or less.

12. The lithium ion secondary battery according to claim 1, wherein the a general formula $Li_xNi_yCo_zMn_{(1-y-z)}O_2$ satisfies $1-y-z \leq 0.4$.

13. The lithium ion secondary battery according to claim 1, wherein the a general formula $Li_xNi_yCo_zMn_{(1-y-z)}O_2$ satisfies $z<y$ and $z<1-y-z$.

14. The lithium ion secondary battery according to claim 1, wherein the a general formula $Li_xNi_yCo_zMn_{(1-y-z)}O_2$ satisfies $y>1-y-z$ and $y>z$.

15. The lithium ion secondary battery according to claim 1, wherein
    the positive electrode active material layer further includes a positive electrode active material containing $LiMn_2O_4$.

16. The lithium ion secondary battery according to claim 1, wherein the content of water relative to the weight of the lithium nickel cobalt manganese composite oxide in the positive electrode active material is 400 ppm.

17. The lithium ion secondary battery according to claim 1, wherein the separator includes an olefin resin layer.

18. The lithium ion secondary battery according to claim 17, wherein the olefin resin layer comprises porous or microporous polyolefin.

19. The lithium ion secondary battery according to claim 1, wherein the negative electrode active material layer comprises at least one material selected from the group consisting of carbon nanofiber, acetylene black, Ketjen black, activated carbon, mesoporous carbon, fullerenes, and carbon nanotube.

20. The lithium ion secondary battery according to claim 1, wherein the negative electrode active material layer comprises at least one binder selected from the group consisting of polyvinylidene fluoride (PVDF), polytetrafluoroethylene (PTFE), polyvinyl fluoride (PVF), polyanilines, polythiophenes, polyacetylenes, polypyrroles, styrene butadiene rubber (SBR), butadiene rubber (BR), chloroprene rubber (CR), isoprene rubber (IR), acrylonitrile butadiene rubber (NBR), carboxymethyl cellulose (CMC), xanthan gum, guar gum, and pectin.

* * * * *